United States Patent [19]

Junkermann

[11] 4,160,656
[45] Jul. 10, 1979

[54] PROCESS FOR DEODORIZING LIQUID MANURE AND REMOVING HARMFUL GASES

[75] Inventor: Helmut Junkermann, Frankfurt, Fed. Rep. of Germany

[73] Assignee: Deutsche Gold- und Silber-Scheideanstalt vormals Roessler, Frankfurt, Fed. Rep. of Germany

[21] Appl. No.: 902,111

[22] Filed: May 2, 1978

[30] Foreign Application Priority Data

May 26, 1977 [DE] Fed. Rep. of Germany ....... 2723753

[51] Int. Cl.² .......................... C05F 3/00; C05C 9/00; C02B 1/34
[52] U.S. Cl. ........................................... 71/21; 71/13; 71/28; 210/63 R

[58] Field of Search ..................... 71/1, 11, 12, 13, 21, 71/22, 28, 31; 210/63 R

[56] References Cited

U.S. PATENT DOCUMENTS

| 125,886 | 4/1872 | Dutch | 71/12 |
| 3,655,395 | 4/1972 | Karnemaat | 71/28 |
| 3,966,450 | 6/1976 | O'Neill | 71/15 |
| 4,021,338 | 5/1977 | Harkin | 210/63 R |

FOREIGN PATENT DOCUMENTS 2640364  3/1978  Fed. Rep. of Germany ............. 71/12

Primary Examiner—Joseph Scovronek
Assistant Examiner—Chris Konkol
Attorney, Agent, or Firm—Cushman, Darby & Cushman

[57] ABSTRACT

Liquid manure is deodorized and harmful gases removed therefrom by introducing formaldehyde and a peroxy compound into the manure one or more times.

15 Claims, No Drawings

PROCESS FOR DEODORIZING LIQUID MANURE AND REMOVING HARMFUL GASES

BACKGROUND OF THE INVENTION

The unpleasant smell of liquid manure, particularly swine and chicken liquid manure, above all in applying the liquid manure during the fertilization of the fields is noticed very annoyingly. Likewise annoying is the development of irritating or harmful gases such as hydrogen sulfide, mercaptans and ammonia within the stable atmosphere if liquid manure is stowed there for a long time below split bottoms. For the protection of the environment, therefore, the elimination or reduction of the stench acquires an increasing significance. Additionally through higher harmful gas concentrations, there can occur with animals as well as with people working in the stables on occasion poisonous appearances, particularly through the effects of hydrogen sulfide or mercaptans.

To the solution of the problem of the reduction or elimination of the stench, there has already been extensive work. Thus, there have been considered both physical methods, as, e.g., aerating the liquid manure with aeration apparatus or units, as well as the addition of biochemical special products or chemicals.

While the aeration is relatively expensive, entirely apart from the odor annoyance of the environment during the aeration, by this aeration there can merely be produced a certain reduction in odor.

This is equally true for the addition of biochemical special products. In the addition of chemicals for the purpose of reducing odor there must be differentiated between masking an odor and the breakdown of the odoriferous materials to odor indifferent components.

Of course, a masking odor can bring about a certain effect in storage; however, the assumption therefore is that the liquid manure is not moved. Of course, there are not tied up thereby the undesired anaerobic fermentation processes which are the main cause of the unpleasant odor. As soon as the liquid manure is moved, which happens above all in bringing it out, the stench occurs reinforced.

Therefore, there are significant for the deodorizing only such additives with which it is possible to tie up the formation of irritant and harmful gases or to change into, or if they are already present, change them to harmless materials.

As has been shown by applicant's experiments, oxidation chemicals such as hydrogen peroxide, peracetic acid, sodium chlorate, sodium chlorite or the so-called peroxy compounds such as sodium peroxide, sodium percarbonate, potassium peroxymonosulfate, sodium peroxydisulfate, potassium peroxydisulfate, ammonium peroxydisulfate, percarbamide and peracetic acid do not bring about the desired effect.

Of course, there can be produced a certain reduction in the concentration harmful gas with several peroxy compounds such as potassium peroxymonosulfate or ammonium peroxydisulfate or percarbamide by using larger amounts, namely, at least 5 liters of 30% aqueous solutions per 1 $m^3$ of liquid manure, but there is no reduction in odor.

With peracetic acid, there can be obtained a certain deodorizing activity but there occurs a strong odor of acetic acid, which apparently overlays the liquid manure odor.

In O'Neill U.S. Pat. No. 3,966,450, there is claimed the deodorization of suspensions of animal excrements with hydrogen peroxide in combination with strong mineral acids.

After that the odor of the animal waste should be reduced by treatment of the excrement with aqueous hydrogen peroxide solution in an amount of 5-500 ppm. of 100% aqueous hydrogen peroxide whereupon the pH value of the suspension is adjusted by addition of mineral acid to a pH of 4-8.

The reworking of this process, however, has had no success in the treatment of swine and poultry liquid manures.

Also by addition of higher amounts of hydrogen peroxide to the liquid manure there takes place solely, with strong foaming spontaneous, decomposition of the hydrogen peroxide. There could not be established a reduction in odor.

Besides the oxidizing chemicals, there has also been added formaldehyde as a taste checking material. Formaldehyde is mixed with liquid manure in the U.S.A., e.g., in the so-called Grazon-Process (see Cattle-Diets, Grazon, Champaign, Ill., 1975).

The use of aqueous formaldehyde solutions of various concentrations as well as the use of paraformaldehyde was not successful. This was also proven by our own experiments.

To be sure at higher additions of formaldehyde the odor of the liquid manure is partially masked by the pungent odor of formaldehyde, however, then simultaneously the mucous membranes are irritated. Because of the irritation of the mucous membranes, formaldehyde cannot be considered for a deodorization.

In German patent application P 26 40 364, 5 there is claimed the use of a combination of aqueous alkali chlorite or hypochlorite solution and aqueous formaldehyde solution for the deodorization of liquid manure.

The prerequisite for the process is that the alkali chlorite or hypochlorite solution and the aqueous formaldehyde solution be mixed into the liquid manure separate from each other.

To be sure with small additions of the above-mentioned aqueous solutions of these materials there can be produced a very good deodorizing effect. However, there is the disadvantage that by careless handling of formaldehyde and alkali chlorite solution there can be formed chlorine dioxide. For safety reasons, therefore, this combination cannot be considered to treat stables.

This deodorization system, therefore, can only be used for liquid manure stored (silo, preliminary pit) outside of stables which should be applied a short time later to the fields.

The purpose of the present invention is to develop a deodorizing agent which can be safely handled, which makes possible a good deodorization and elimination of harmful (noxious) gases but is not dangerous for people and animals.

SUMMARY OF THE INVENTION

It has now been found that liquid manure can be successfully deodorized and that simultaneously the harmful gases can be eliminated if there is brought into the liquid manure formaldehyde and a peroxy compound.

Preferably the formaldehyde and peroxy compounds are first mixed together and added as a single mixture to the liquid manure.

The treatment of the liquid manure normally is only carried out once but if it is needed several times it can also be repeated, see Examples 7-10.

The stability of the mixture of formaldehyde and peroxy compound is dependent upon the particular peroxy compound; the maximum is about 20 days.

The formaldehyde is employed in the form of an aqueous solution, e.g., in the concentration range of 30 to 50 weight %, preferably in the form of commercial concentrations, as, e.g., a 30 weight % solution.

As peroxy compounds which also are available in commerce, there can be used, for example, hydrogen peroxide, urea peroxyhydrate, potassium peroxymonosulfate, sodium peroxydisulfate, potassium peroxydisulfate, ammonium peroxydisulfate, sodium carbonate peroxyhydrate, (sodium percarbonate), potassium percarbonate, percarboxylic acids such as peracetic acid, perpropionic acid.

The above-mentioned peroxy materials can be used individually or in admixture with each other.

Of the peroxy compounds, sodium or ammonium peroxydisulfate (sodium or ammonium persulfate) are particularly suited, urea peroxyhydrate (urea peroxide) also is well suited but occasionally on long standing the urea peroxide-formaldehyde mixture leads to the formation of resinous condensates; likewise, the percarboxylic acids lead to good results if the mixture with formaldehyde is produced either directly before the use or if the deodorization reagents are introduced separately from each other into the liquid manure.

This is also true for the use of hydrogen peroxide as the oxidation reagent; of course in this case the foam can eventually be disturbing through escape of oxygen.

In contrast to the system "alkali chlorite and formaldehyde solution" whose components must be added into the liquid manure in every case separately from each other, the use of the peroxy compounds, as already stated, has a considerable advantage since it can be mixed with the formaldehyde solution and can be added as an individual deodorization solution to the liquid manure.

There can be used, for example, aqueous peroxy compounds in the range of concentration of 10-40 weight %, preferably 30-35 weight % solutions. The above-mentioned preferred concentrations are generally also true for the formaldehyde which indeed is commercially available as a 30% solution. However, here there is also the possibility of directly using higher or lower concentrations.

Furthermore, crystalline peroxy compounds can also be dissolved in solid form directly in the formaldehyde solution and so be added as deodorization solution.

Peroxy compound and formaldehyde are used, based on 100 weight %, generally in a weight ratio of 1:1, however, they can also be added in weight ratios of from 1:3 to 3:1. preferably there are used equally concentrated aqueous solutions.

It is sufficient to add 1 to 3 liters of the deodorization solutions produced in this manner per cubic meter of liquid manure. With liquid manure which has already become strongly fermented, the amount of additive can even be increased to 4-6 liters per cubic meter. Still higher amounts of additive are seldom necessary.

There has proven most favorable the use of a mixture of ammonium persulfate, in the form of a 30 weight % aqueous solution and 30 weight % of an aqueous formaldehyde solution.

Thereby equal parts by volume of both solutions can be mixed with each other.

However, it is also by all means possible to use 2 or 3 parts by volume of ammonium persulfate solution and one part by volume of formaldehyde solution or the reverse. No warming occurs in the mixing, the deodorization solution obtained is durable in its effectiveness for a long time, i.e., over a period of time of up to 3 weeks. An optimal effect is obtained by freshly produced deodorization solution. The like is also true for sodium persulfate.

However, the use of ammonium persulfate has the advantage over sodium persulfate that in the combination with formaldehyde after addition of the ammonium persulfate containing deodorization mixture to the liquid manure almost spontaneously the deodorization takes place. A further advantage is the enrichment of the nitrogen content of the liquid mixture which is subsequently distributed on the fields.

The effect of the deodorization depends on the amount of the solution mixed with the liquid manure. Thus with an amount of addition of 1-2 liters of the mixed solution of ammonium persulfate and formaldehyde per cubic meter, a good deodorization effect is produced while with 3 liters per cubic meter an optimum effect is produced.

Only with strongly fermented liquid manures must the amount of additive be increased to 4 or a maximum of 5 liters per cubic meter.

As already stated, the effect of the particularly well suited combination of ammonium persulfate and formaldehyde occurs already several minutes after addition to the liquid manure. Thus after 5-10 minutes, the unpleasant odor is clearly reduced and after about 15 minutes there is scarcely perceptible an odor of the liquid manure.

The deodorization solution can be supplied to the liquid manure both shortly before it is taken away as directly in the liquid manure tank car, in the silo, or, to improve the stable atmosphere, directly into the stable.

The elimination of the harmful (noxious) gases takes place relatively quickly, already after several days the effect of daily use is clear.

The reduction or checking of the odor of the liquid manure treated with the deodorization solution persists for at least 10-14 days with a single addition of the deodorization solution. This time is sufficient for example to treat the liquid manure before bringing it away. It goes without saying by dosaging very small amounts of fresh deodorization solution, 1 liter of solution per cubic meter suffices, to a liquid manure again stinking after this time there can be produced renewed deodorization and elimination of the harmful gases.

The materials brought into the liquid manure because of the reciprocal chemical effect are decomposed relatively quickly and completely, so that by applying the treated, low odor liquid manure to the fields no harmful materials can go into the ground. Rather, for example, by the addition of the ammonium salt of peroxydisulfuric acid the fertilizer effect of the treated liquid manure is still further improved in comparison to the untreated liquid manure. Therefore, there also does not take place any damage to the plants through the liquid manure treated with the above-mentioned additives.

Fertilizer tests with treated, low odor liquid manure with plants in different stages of growth show that the additives have no disadvantages for the growth of the plants compared to the untreated highly smelling liquid manure.

Before further explaining the process in the following examples, there will be described the methods of qualitatively and quantitatively detecting the most important harmful gas in the liquid manure.

For this purpose liquid manure is added, for the most part in the amount of 1 liter, in a 3-liter Quickfit round bottomed flask. The flasks were equipped with a gas inlet tube and a tightly sealed stirrer. A series of outlet openings additionally were fitted to the surface ground cover. The flasks were located in a water bath held at 25° C. by means of a thermostat. The liquid manure was held in motion under powerful stirring while simultaneously there was blown over the liquid manure an inert gas stream of about 14 liters/hour of nitrogen. The inert gas laden with the odoriferous components flowed through small tubes, system DRAGER which were affixed to the outlet openings. The small tubes, system DRAGER served to detect and quantitatively determine hydrogen sulfide, mercaptans, ammonia, hydrocyanic acid and formaldehyde. In order to remove the still present residue of harmful gases in the gas space above the liquid manure before the actual measurement, the apparatus was first continuously thoroughly rinsed with nitrogen for 10 minutes. This process above all is necessary with the liquid manure samples provided with additives. Only then are the small tubes, system DRAGER attached. The detection or measurement of the harmful gases always takes place within a time of 1 hour. All data in regard to the concentration of the harmful gases is based on these test conditions.

Besides the measurement of harmful gas, the liquid manure samples also were continuously tested sensorially by several test people. These odor testings were carried out in periodic intervals several times for each sample. The liquid samples are located in open cylindrical containers of equal dimensions.

The process can comprise, consist essentially of or consist of the steps set forth and the materials used can comprise, consist essentially of or consist of those set forth.

Unless otherwise indicated all parts and percents are by weight.

The following examples further explain the invention.

DESCRIPTION OF THE PREFERRED EMBODIMENTS

EXAMPLE 1

Fresh swine liquid manure originating from different sties underwent the odor test as well as the measurement of harmful gas. Thereby there were established the following concentrations of harmful gases:

| | |
|---|---|
| Hydrogen sulfide | 70–100 ppm |
| Mercaptans | 180–310 ppm |
| Ammonia | 70–90 ppm |
| HCN | 1–4 ppm |

The stinking liquid manure samples were treated with 35 weight % hydrogen peroxide solution, or 30% aqueous sodium peroxide solution, or 15% sodium percarbonate solution, or 15% potassium monopersulfate solution, or 30% sodium persulfate solution, or 30% ammonium persulfate solution, or 30% urea peroxide solution or 15 and 30% peracetic acid. The amounts of additive were between 1 and 5 liters based on 1 cubic meter of liquid manure. To be sure through the above-mentioned additives the harmful gases could be somewhat partially reduced, however, the unpleasant liquid odor could not be eliminated or reduced by these additives. In the case of using 30% peracetic acid, the liquid manure odor was masked by a strong odor of acetic acid.

In using hydrogen peroxide, there occurred very strong foaming which increased with increased amounts of additive without a reduction in odor taking place.

EXAMPLE 2

(a) There was stirred into fresh swine liquid manure a mixture produced shortly before and consisting of 30% aqueous urea peroxide solution and 30% aqueous formaldehyde solution. The molar ratio urea peroxide: formaldehyde was 1:3. There were used 2 liters of mixture per cubic meter of liquid manure. Except for ammonia whose concentration still was about 40 ppm, all remaining harmful gases could be eliminated. Besides a somewhat weakened, liquid manure odor was still present.

(b) The same liquid manure was again treated with a mixture of 30% urea peroxide solution plus 30% formaldehyde solution but the molar ratio of urea peroxide: formaldehyde was 1:2. Likewise there were used 2 liters of mixture per cubic meter of liquid manure. Except for ammonia whose concentration still amounted to about 40 ppm, the remaining harmful gases were no longer detected. A strong weakening of the liquid manure odor was established.

(c) A further liquid manure sample was treated with a mixture of the same components of 30% urea peroxide solution plus 30% formaldehyde solution; the molar ratio between urea peroxide and formaldehyde was 1:1. In using 2 liters of mixture per cubic meter of liquid manure except for ammonia whose portion still was about 40 ppm, the remaining harmful gases were eliminated; the deodorization effect was substantially more favorable than in the previously given comparison additives.

EXAMPLE 3

Fresh swine liquid manure was treated with stirring with a mixture produced shortly before and consisting of a 15% aqueous sodium percarbonate solution (because of the limited solubility of sodium percarbonate, higher concentrations are not possible) and a 30% aqueous formaldehyde solution. The mixing ratio of the two solutions was 1:1. The amount of addition of the mixture was 3 liters per cubic meter of liquid manure. The measurement of harmful gas showed that except for ammonia in the concentration of >40 ppm no other harmful gases could any longer be detectable. Initially, there was established a favorable deodorization effect which, however, left after the treated liquid manure after standing for 1 to 2 hours.

Larger amounts of percarbonate solution and formaldehyde solution mixed together lead to decomposition with an exothermic reaction so that such a mixture is usable for only a few minutes after its production.

EXAMPLE 4

(a) Fresh swine liqid manure was treated with a mixture produced shortly before from 30% aqueous peracetic acid and 30% aqueous formaldehyde solution. Per cubic meter of liquid manure there was used a mixture of 1 liter of formaldehyde solution and 2.5 liters of peracetic acid solution which corresponds to a molar ratio of the two materials of about 1:1.

A few minutes after the action of the mixture there could already be observed a good deodorization. The harmful gases, except for 10 ppm of ammonia were eliminated, additionally there was observed a strong acetic acid odor.

The named mixture is only stable for a few minutes because after about 10 to 15 minutes there takes place decomposition with a strongly exothermic reaction.

(b) A further sample of the same swine liquid manure was treated with a mixture of 30% peracetic acid and 30% formaldehyde solution. The mixing ratio of the two components was 1:1. Per cubic meter of liquid manure there was used an additive amount of 2 liters of the mixture. Here also the harmful gases could be eliminated up to an ammonia content of 40 ppm. The deodorization effect satisfies the requirements. Even after standing for about 10 days, the thus treated liquid manure still had sufficient deodorization.

(c) As already mentioned, a mixture of peracetic acid and formaldehyde can be used only a few minutes after production since already after 10 to 15 minutes spontaneous decomposition takes place. For this reason, fresh swine liquid manure was first mixed with 30 weight % formaldehyde solution and subsequently with the same volume of 30 weight % peracetic acid. In all there were added an amount of 2 liters per cubic meter of liquid manure. The deodorizing effect was good, the harmful gases could be reduced up to 0%; of ammonia there was still detectable only traces, of the order of magnitude of 1 ppm.

EXAMPLE 5

(a) Fresh swine liquid manures of various sources having dry material contents between 2 and 8% were treated with freshly produced mixtures consisting of 35% aqueous hydrogen peroxide solution and 30% aqueous formaldehyde solution. The mixing ratio of the two solutions was always 1:1.

The amount of addition of the mixtures was 1 to 2 liters per cubic meter of liquid manure. After a time of action of 10-15 minutes, there could no longer be established a substantial deodorization. The harmful gases to be sure were strongly reduced, but still detectable in traces. Only after a time of 30 minutes was the deodorization good; the harmful gases except for ammonia whose concentration amounted to >40 ppm/l were eliminated.

Also mixtures of hydrogen peroxide and formaldehyde solutions are only usable for about 10-15 minutes after they are mixed together. After this time, the mixture heats up very strongly and decompose with foaming.

(b) a mixture of equal parts of 35% hydrogen peroxide solution and 30% formaldehyde solution was allowed to stand with cooling for about 10 days. Subsequently, this "aged" mixture was mixed into fresh swine liquid manure in an amount of 3 l/m³. Even after more than 30 minutes longer action the deodorization was insufficient; the harmful gases could only be partially reduced. Thus there was still measured harmful gas concentrations of about 2 ppm hydrogen sulfide, about 10 ppm mercaptans, about 40 ppm ammonia and about 2-3 ppm HCN.

EXAMPLE 6

(a) Because of the quick decomposition of the mixtures of hydrogen peroxide and formaldehyde solution there was first stirred into fresh liquid manure 0.5 l/m³ of 30% aqueous formaldehyde and subsequently 0.5 l/m³ of 35% aqueous hydrogen peroxide solution. The harmful gases, except for ammonia whose concentration still was 54 ppm could be reduced to 0% the deodorization was satisfactory. Of course in the addition of hydrogen peroxide there were formed strong foams.

(b) In a second addition, there was first added to fresh swine liquid manure 1 liter of 30% formaldehyde solution and subsequently 1 liter of 35% hydrogen peroxide solution per cubic meter of liquid manure. Here the ammonia content could be reduced to 14 ppm/l, other harmful gases were not detectable.

The deodorization effect was good, of course here also there arose very strong foaming with addition of the hydrogen peroxide.

(c) A further sample of fresh swine liquid manure was first treated with 2 liters of 30% formaldehyde solution and subsequently with 2 liters of 35% hydrogen peroxide solution per cubic meter of liquid manure. The harmful gases could be reduced to 0% except for ammonia which was still detectable in an amount of 12 ppm. The deodorization effect was good; here also there was established considerable foaming with addition of the hydrogen peroxide solution.

EXAMPLE 7

Fresh swine liquid manure was treated with a freshly produced mixture of equal parts by volume of 30% aqueous formaldehyde solution and 35% aqueous hydrogen peroxide solution. The amounts of addition of the mixed solutions were 1, 2 and 3 liters per cubic meter of liquid manure. The liquid manure samples were examined after specific standing times for deodorization and harmful gas concentration. At the lower additions of 1 and 2 liters of mixture per cubic meter of liquid manure, the deodorization was maintained for about 6 days. The harmful gases were reduced to 0%, except for ammonia which was still present in a concentration of about 40 ppm with an amount of addition of 1 liter of mixture per cubic meter of liquid manure and in a concentration of about 20 ppm with an amount of addition of 2 liters of mixture per cubic meter of liquid manure.

After a standing time of 6 days, the unpleasant liquid manure odor again occurred, the ammonia concentration increased sharply and there were also detected traces of harmful gases such as hydrogen sulfide and mercaptans.

EXAMPLE 8

Fresh swine liquid manure was treated with a freshly produced mixture of 2 parts by volume of 30% aqueous formaldehyde solution and 1 part by volume of 35% aqueous hydrogen peroxide solution whereby there was used an amount of addition of 3 liters per cubic meter of liquid manure. The harmful gases, except for ammonia whose concentration was still 40 ppm, could be eliminated. It is true the deodorization effect was not as favorable as with the previously used mixing ratio of 1 part by volume of 30% formaldehyde solution and 1 part by volume of 35% hydrogen peroxide solution.

EXAMPLE 9

The liquid manure samples of Example 7 which after longer storage again developed liquid manure odor and harmful gases were once more treated with a freshly produced mixture of 30% aqueous formaldehyde solution and 35% hydrogen peroxide solution (mixing ratio 1:1). The amount of addition of the mixture was 1 liter per cubic meter of liquid manure. After the renewed treatment, the liquid manure samples were again unobjectionably free from odor; of harmful gases there was merely ascertained ammonia at a concentration of about 40 ppm.

EXAMPLE 10

20 liters of a mixed solution was produced by stirring together uniform volumes of 30% aqueous ammonium persulfate solution and 30% aqueous formaldehyde solution. In contrast to the mixtures mentioned in the previous examples, there resulted with this mixture neither heating nor decomposition. The mixed solution had high effectiveness for at least 20 days.

Samples of fresh swine liquid manure were treated with this solution mixture whereby amounts of addition of 1, 2 and 3 liters per cubic meter of liquid manure were used.

(a) At the lowest amount of addition of 1 liter per cubic meter of liquid manure, the deodorization was still not completely satisfactory, there were even still found traces of harmful gases, e.g., 3 ppm hydrogen sulfide, about 14 ppm mercaptans and about 40 ppm ammonia.

(b) However, already with the amount of addition of 2 liters of mixture per cubic meter of liquid manure, a very good deodorization effect was established, namely, within a time of 5 minutes after addition. The harmful gas reduction to 0% confirmed the sensorial impression of deodorization. Of ammonia, there was merely found 1 ppm. The deodorization effect was maintained about 5-6 days, after which time there occurred the first traces of harmful gases.

(c) With the amount of addition of 3 liters of mixture per cubic meter of liquid manure, the effect was at the best. The total harmful gases were spontaneously reduced to 0% after addition of the deodorization solution; the deodorization was free from trouble. Only after 3 days of standing time of the treated liquid manure could there be found an ammonia concentration of 1 ppm. The deodorization effect was good for 10 days. After this time, there first occurred traces of harmful gases.

After a further 10 days of standing time to this liquid manure sample, which no longer was free from trouble, there was added an amount of 1 liter of this mixture per cubic meter of liquid manure. Immediately after addition of the deodorization solution, the liquid manure was again free from objectionable odor, all harmful gases were eliminated.

EXAMPLE 11

A swine liquid manure having the high solids content of 8% which already was strongly fermented and consequently had an especially unpleasant stink was treated with a freshly produced mixed solution consisting of 30% aqueous ammonium persulfate solution and 30% aqueous formaldehyde solution. The mixing ratio of the two components was 1:1 by volume. There were used 3 liters of mixed solution per cubic meter of liquid manure. Immediately after addition of the deodorization solution, there was found freedom from odor and reduction of harmful gas to 0%.

EXAMPLE 12

The swine liquid manure used in Example 11 was treated with a 20-day old mixed solution consisting of 30% aqueous ammonium persulfate solution and 30% aqueous formaldehyde solution (mixing ratio 1:1 by volume). Here also there was found immediate deodorization and reduction of harmful gas to 0%.

EXAMPLE 13

Fresh swine liquid manure was treated with a mixed solution consisting of 1 part by volume of 30% aqueous ammonium persulfate solution and 2 parts by volume of 30% aqueous formaldehyde solution. Also using this deodorizing solution there was found a good deodorizing effect, the total harmful gases could be reduced to 0% and with a volume ratio of 1:3 the deodorization was even better.

EXAMPLE 14

Fresh swine liquid manure was treated with a mixture consisting of 2 parts by volume of 30% aqueous ammonium persulfate solution and 1 part by volume of 30% aqueous formaldehyde solution.

The total amount was 3 liters of mixed solution per cubic meter of liquid manure. There was also produced a very good deodorization effect with this deodorization solution; all harmful gases were eliminated. With a volume ratio of 3:1 the deodorization was even better.

EXAMPLE 15

A mixed solution stood for over a month and consisting of equal parts by volume of 30% aqueous ammonium persulfate and 30% aqueous formaldehyde was used to treat fresh swine liquid manure, whereby an amount of 3 liters of mixing solution was used per cubic meter of liquid manure. The stored mixed solution had already changed to yellowish. In this case, the deodorization effect was not very favorable; there were even found traces of harmful gases which amounted to hydrogen sulfide below 1 ppm, with mercaptans amounted to about 2 ppm and with ammonia amounted to about 7 ppm.

This means that a mixed solution can be permitted to age a maximum of 20 days in order to still make possible a favorable deodorization effect. Longer aged solutions are no longer usable.

EXAMPLE 16

15 grams of ammonium persulfate were dissolved in 100 ml of 15% aqueous formaldehyde solution and called "Mixing Solution A".

30 grams of ammonium persulfate were dissolved in 100 ml of 30% aqueous formaldehyde solution and called "Mixing Solution B".

A series of samples of fresh swine liquid manure was treated with "Mixing Solution A" and another series with "Mixing Solution B". In the case of mixing solution A, there were always used 3 liters per cubic meter of liquid manure, in the case of mixed solution B, there were used 1.5 liters/cubic meter of swine liquid produced. In both series of investigation a very good deodorizing effect could be produced, all harmful gases were reduced to 0%.

EXAMPLE 17

Analogous to Example 16, there were produced corresponding mixed solutions wherein in place of ammonium persulfate there were dissolved the corresponding amounts of sodium persulfate in 15 and 30% formaldehyde solution. Besides there was produced an additional mixed solution consisting of equal volumes of 30% aqueous sodium persulfate solution and 30% aqueous formaldehyde solution.

Samples of fresh swine liquid manure were treated with these solutions. The deodorization effect was not so favorable as with the ammonium persulfate containing mixed solutions. Only after several hours standing could there be established an improvement of the deodorization.

EXAMPLE 18

Chicken liquid manure was treated with a freshly produced mixed solution from equal parts by volume of 30% aqueous ammonium persulfate and 30% aqueous formaldehyde solution. The amount of addition of the mixed solution was 3 liters per cubic meter of liquid manure. Already several minutes after mixing in the liquid manure, except for a weak ammonia odor, was odor free.

The harmful gas measurement showed that the harmful gases were reduced to 0%, only an ammonia concentration of about 40 ppm was found.

EXAMPLE 19

A strong, stored chicken liquid manure of very unpleasant odor was treated with the same amount of the mixed solution as in Example 18. For the deodorization and harmful gas reduction, however, the addition of 3 liters per cubic meter was not entirely sufficient. To be sure a clear reduction in odor was ascertainable, the concentration of the harmful gases also reduced. Thus there was still found merely 1 ppm of hydrogen sulfide, 3 ppm of mercaptans and 40 ppm of ammonia.

An increase of the amount of addition of 4 liters per cubic meter of liquid manure, however, brought about the desired effect. There could already be produced several minutes after the mixing in of the deodorization solution freedom from odor up to an ammonia odor; the harmful gases could be reduced to 0%, there was only determined ammonia in an amount of 30 ppm.

EXAMPLE 20

During the pumping of an aged, already fermented swine liquid manure of strongly unpleasant odor from a supply pit into a 3 cubic meter liquid manure tank car there were added to this liquid manure in all 9 liters of a mixed solution consisting of equal parts by volume of 30% aqueous ammonium persulfate solution and 30% aqueous formaldehyde solution. The treated liquid manure about 10-15 minutes after the mixing in of the deodorization solution was applied to field strips as a fertilizer. Already after this time the sprayed liquid manure was practically odorless, in contrast to untreated stinking liquid manure, which in conjunction therewith was applied.

EXAMPLE 21

In a stable for fattening swine with 450 places, there was located below the bottom grate of the stable a large pit space which was divided in 10 individual boxes separated from each other. Dimensions of the individual boxes: Length 7.5 meters, width 2.2 meters, height 0.8 meter. Per box and per day there accumulated about 0.1 cubic meter of liquid manure.

During a time of 3 weeks, there were added daily in each box 300 ml of a mixed solution consisting of equal parts by volume of 30% aqueous ammonium persulfate solution and 30% aqueous formaldehyde solution. Already 3 days after the beginning of this treatment there could be ascertained a substantial improvement of the stuffy stable atmosphere. After only one week, the improvement was drastic; after stopping the treatment already within 1-2 days, there was again created a deterioration of the stable atmosphere.

The liquid manure treated during the stated time of 3 weeks was subsequently applied to test fields and was also free from objectionable odor during the application, in comparison to untreated liquid manure which had the unpleasant stink of liquid manure.

What is claimed is:

1. A process for deodorizing liquid manure and removing harmful gases therefrom comprising applying to the liquid manure formaldehyde and a peroxy compound in the weight ratio of formaldehyde (100 weight % basis) and peroxy compound (100 weight % basis) of 1:3 to 3:1.

2. A process according to claim 1 wherein the formaldehyde and peroxy compound are premixed with each other prior to mixing with the liquid manure.

3. A process according to claim 2 wherein the formaldehyde and peroxy compound are added as an aqueous solution to the liquid manure.

4. A process according to claim 3 wherein the peroxy compound has a solubility in water of at least 10%.

5. A process according to claim 4 wherein there is employed a 30 to 50% aqueous formaldehyde solution and a 10 to 40% aqueous peroxy compound solution to form said premixture, the weight ratio of formaldehyde to peroxy compound is from 1:3 to 3:1.

6. A process according to claim 1 wherein the peroxy compound is hydrogen peroxide, urea peroxide, potassium monoperoxysulfate, sodium persulfate, potassium persulfate, ammonium persulfate, sodium percarbonate or a percarboxylic acid.

7. A process according to claim 6 wherein the peroxy compound is ammonium persulfate.

8. A process according to claim 7 wherein the formaldehyde and ammonium persulfate are premixed in a weight ratio of 1:3 to 3:1 and the formaldehyde and ammonium persulfate are added as an aqueous solution to the liquid manure.

9. A process according to claim 8 wherein there is employed 1 to 6 liters of the deodorizing solution per cubic meter of liquid manure.

10. A process according to claim 6 wherein there is employed 1 to 6 liters of aqueous deodorizing solution containing the formaldehyde and peroxy compound in the weight ratio of 1:3 to 3:1 per cubic meter of liquid manure.

11. A process according to claim 1 wherein there is employed 1 to 6 liters of an aqueous solution of the formaldehyde and peroxy compound per cubic meter of liquid manure.

12. A process according to claim 1 wherein the peroxy compound is added in crystalline form to aqueous formaldehyde to form a premix and this premix is then added to the liquid manure.

13. A process according to claim 9 wherein the weight ratio of formaldehyde to ammonium persulfate is 1:1.

14. A process according to claim 6 wherein the weight ratio of formaldehyde to peroxy compound is 1:1.

15. A process according to claim 1 wherein the weight ratio of formaldehyde to peroxy compound is 1:1.

* * * * *